United States Patent
Wang et al.

(10) Patent No.: US 9,273,807 B2
(45) Date of Patent: Mar. 1, 2016

(54) SEALING DEVICE OF A LEVEL METER

(71) Applicant: FINETEK CO., LTD., New Taipei (TW)

(72) Inventors: Chih-Wen Wang, New Taipei (TW); Ting-Kuo Wu, New Taipei (TW); Yu-Yen Lo, New Taipei (TW); Chao-Kai Cheng, New Taipei (TW)

(73) Assignee: FINETEK CO., LTD. (TW)

( * ) Notice: Subject to any disclaimer, the term of this patent is extended or adjusted under 35 U.S.C. 154(b) by 155 days.

(21) Appl. No.: 14/259,346

(22) Filed: Apr. 23, 2014

(65) Prior Publication Data

US 2015/0252924 A1    Sep. 10, 2015

(30) Foreign Application Priority Data

Mar. 6, 2014    (TW) .............................. 103203778 U

(51) Int. Cl.
| | |
|---|---|
| *G01D 11/24* | (2006.01) |
| *F16L 19/06* | (2006.01) |
| *G01F 23/00* | (2006.01) |
| *F16L 19/075* | (2006.01) |
| *H02G 3/06* | (2006.01) |

(52) U.S. Cl.
CPC ............. *F16L 19/061* (2013.01); *F16L 19/075* (2013.01); *G01F 23/00* (2013.01); *H02G 3/06* (2013.01)

(58) Field of Classification Search
CPC ....... G01D 11/24; G01D 11/245; H02G 3/06; F16L 19/061
USPC ......................................................... 73/431
See application file for complete search history.

(56) References Cited

U.S. PATENT DOCUMENTS

2008/0060430 A1 *    3/2008    Galloway ............ G01F 23/2968
73/290 R

* cited by examiner

*Primary Examiner* — Lisa Caputo
*Assistant Examiner* — Jamel Williams
(74) *Attorney, Agent, or Firm* — Hershkovitz & Associates PLLC; Abe Hershkovitz

(57) ABSTRACT

A sealing device of a level meter is acid-and-alkali-resistant and pressure-resistant, and has a flexible outer tube, a plug, a female union connector and a male union connector. The flexible outer tube has an expansion neck formed on a bottom end thereof. The plug is mounted in the expansion neck. The female union connector is mounted around the expansion neck. The male union connector engages the female union connector by means of threaded engagement. The male union connector has a through hole for tying a weight such that the flexible outer tube is stretched along a force of a gravitational force of the weight. As being wholly and uniformly subjected to the gravitational force of the weight, the male union connector is less damage-prone. Accordingly, the tensile strength of the level meter is effectively increased, and a life duration of the level meter therefore prolongs.

16 Claims, 3 Drawing Sheets

SEALING DEVICE OF A LEVEL METER

BACKGROUND OF THE INVENTION

1. Field of the Invention

The present invention relates to a sealing device of a level meter, and more particularly to an acid-and-alkali-resistant and pressure-resistant sealing device of a level meter to effectively seal an end portion of the level meter and to make the level meter waterproof and leakage-proof and less prone to fracture and damage.

2. Description of the Related Art

With reference to FIG. 3, given a slender probe module as an example of a conventional flexible level meter, the conventional flexible level meter has a flexible engineering plastic tube 90 and a plug 100. The flexible engineering plastic tube 90 is taken as an outer tube of a sensing probe being bendable and acid-and-alkali resistant. The plug 100 is inserted into a lower end of the engineering plastic tube 90 to seal the engineering plastic tube 90 for protection of an electronic sensing module inside the engineering plastic tube 90.

After the plug 100 is inserted into the lower end of the engineering plastic tube 90, a junction between the plug 100 and the engineering plastic tube 90 is welded and a welding joint 110 is formed at the junction. A weight is further suspended under the plug 100 by hanging the weight with a wire through a hole 101 of the plug 100 after the welding process such that the conventional flexible level meter can be stretched along a direction of gravity by the gravitational force of the weight.

However, if welding is the only means to bind the plug 100 and the engineering plastic tube 90 together, the welding joint 110 is subjected to the gravitational force of the weight alone. Hence, cracking can easily occur in the welding joint 110 due to the gravitational force of the weight and liquid outside the engineering plastic tube 90 infiltrates the engineering plastic tube 90 from the crack to damage the electronic sensing module inside the engineering plastic tube 90.

SUMMARY OF THE INVENTION

An objective of the present invention is to provide a level meter and a sealing device thereof effectively sealing an end portion of the level meter to make the level meter waterproof and leakage-proof and less prone to fracture and damage.

To achieve the foregoing objective, the sealing device has a flexible outer tube, a plug, a female union connector and a male union connector.

The flexible outer tube has a bottom end and an expansion neck. The expansion neck is formed on the bottom end of the flexible outer tube and is greater in inner diameter than a portion of the flexible outer tube that is higher than the expansion neck;

The plug is cylindrical, and is inserted into the expansion neck of the flexible outer tube in a close-fitting manner.

The female union connector takes the form of a cap with an open end facing down, and has a through hole and an inner thread.

The through hole is formed through a top of the female union connector to communicate with the open end for the female union connector to be selectively mounted around a bordering portion between the expansion neck of the flexible outer tube and the portion of the flexible outer tube that is higher than the expansion neck.

The inner thread is formed on an inner wall of the through hole of the female union connector.

The male union connector has a cylindrical solid and an annular wall. The cylindrical solid is formed on a bottom end of the male union connector and has a through hole centrally formed through the cylindrical solid.

The annular wall is formed on a top end of the male union connector and has an outer thread formed on a periphery of the annular wall to correspond to the inner thread of the female union connector.

To achieve the foregoing objective, the level meter has a flexible outer tube, an electronic sensor, an outer tube fastening member, an electrical connection module and a sealing device.

The flexible outer tube has a top end, a bottom end, and an expansion neck. The expansion neck is formed on the bottom end of the flexible outer tube and is greater in inner diameter than a portion of the flexible outer tube that is higher than the expansion neck.

The electronic sensor is mounted inside the flexible outer tube.

The outer tube fastening member is mounted on the top end of the flexible outer tube.

The electrical connection module is mounted in the top end of the flexible outer tube, and is adapted to electrically connect the electronic sensor inside the flexible outer tube to an external sensing system and transmit electrical signals sensed by the electronic sensor to the external sensing system.

The sealing device has a plug, a female union connector and a male union connector.

The plug is cylindrical, and inserted into the expansion neck of the flexible outer tube in a close-fitting manner.

The female union connector takes the form of a cap with an open end facing down, and has a through hole and an inner thread.

The through hole is formed through a top of the female union connector to communicate with the open end for the female union connector to be selectively mounted around a bordering portion between the expansion neck of the flexible outer tube and the portion of the flexible outer tube that is higher than the expansion neck.

The inner thread is formed on an inner wall of the through hole of the female union connector.

The male union connector has a cylindrical solid and an annular wall.

The cylindrical solid is formed on a bottom end of the male union connector and has a through hole centrally formed through the cylindrical solid.

The annular wall is formed on a top end of the male union connector and has an outer thread formed on a periphery of the annular wall to correspond to the inner thread of the female union connector.

Given the foregoing sealing device and the level meter, the expansion neck of the flexible outer tube can be sealed by the plug and the leakage prevention member. The female union connector engages the male union connector over a bordering portion between the expansion neck of the flexible outer tube and the portion of the flexible outer tube that is higher than the expansion neck. A weight can be suspended under the male union connector by tying the weight through the through hole of the male union connector for the flexible outer tube to be stretched along the direction of the gravitational direction of the weight. As the gravitational force of the weight is wholly and uniformly applied to the male union connector, no damage to the level meter is caused due to the gravitational force. Accordingly, the tensile strength of the level meter is effectively increased, and life duration of the level meter therefore prolongs.

DETAILED DESCRIPTION OF THE INVENTION

Figure 1:
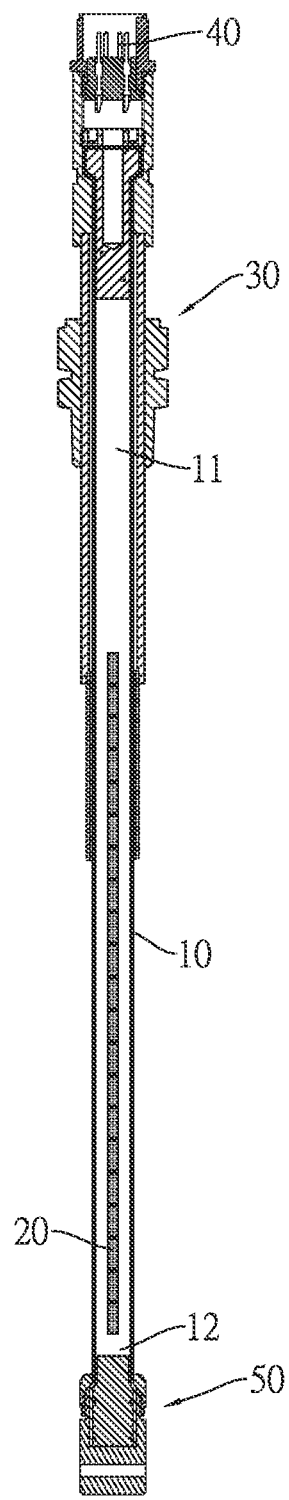
FIG. 1 is a side view in partial section of a level meter in accordance with the present invention.

With reference to FIG. 1, a level meter in accordance with the present invention has a flexible outer tube 10, an electronic sensor 20, an outer tube fastening member 30, an electrical connection module 40 and a sealing device 50.

The flexible outer tube 10 is slender and hollow, and has a top end 11 and a bottom end 12. The electronic sensor 20 is mounted inside the flexible outer tube 10. The outer tube fastening member 30 is mounted on the top end 11 of the flexible outer tube 10. The electrical connection module 40 is mounted in the top end 11 of the flexible outer tube 10 for the electronic sensor 20 inside the flexible outer tube 10 to be electrically connected to an external sensing system and transmit electrical signals sensed by the electronic sensor 20 to the external sensing system for further analysis.

Figure 2:
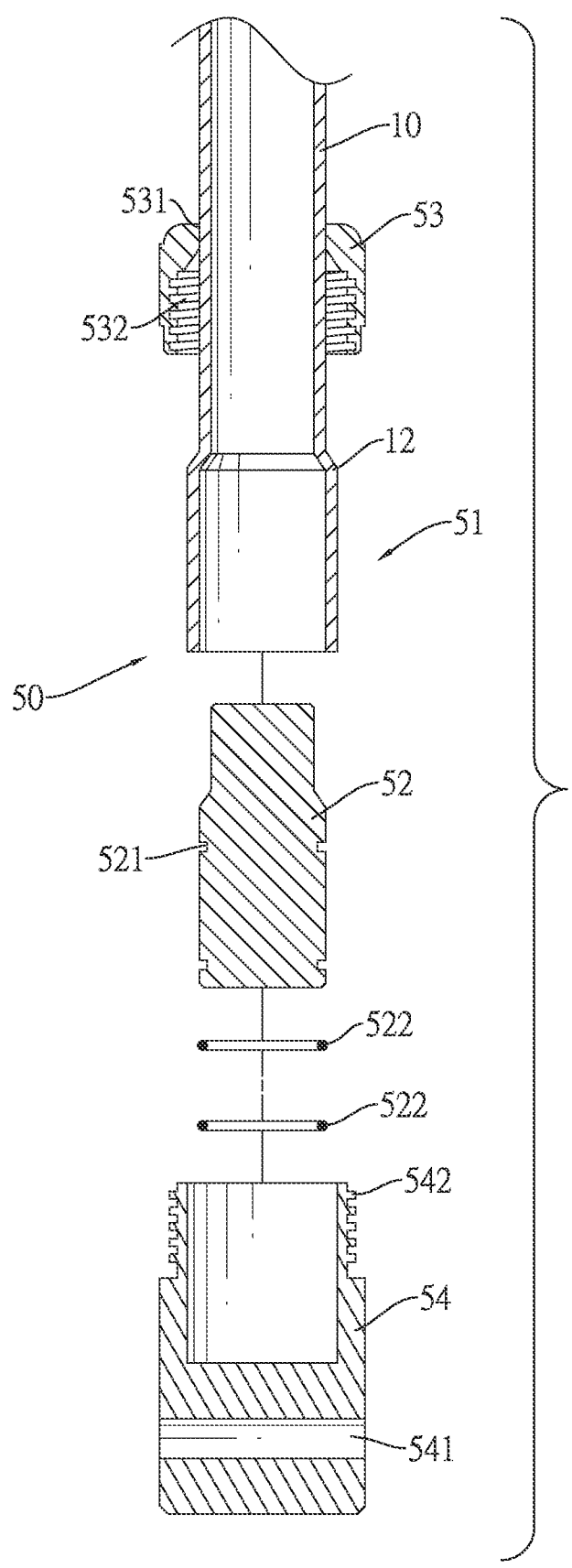
FIG. 2 is a enlarged exploded side view in partial section of a sealing device of the level meter in FIG. 1.
Figure 3:
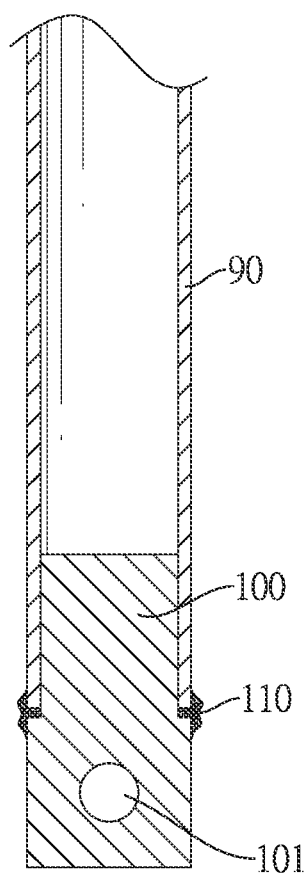
FIG. 3 is a side view in partial section of a suspension device of a conventional flexible level meter.

With reference to FIG. 2, the sealing device 50 is mounted in the bottom end 12 of the flexible outer tube 10, and has an expansion neck 51, a plug 52, a female union connector 53 and a male union connector 54.

The expansion neck 51 is formed on the bottom end 12 of the flexible outer tube 10 and has an inner diameter greater than an inner diameter of a portion of the flexible outer tube 10 that is higher than the expansion neck 51.

The plug 52 is cylindrical, is inserted into the expansion neck 51 in a close-fitting manner, and has at least one annular groove 521 and at least one leakage prevention member 522. The at least one annular groove 521 is formed around a periphery of the plug 52. Each one of the at least one leakage prevention member 522 is mounted in a corresponding annular groove 521, and may be a resilient seal ring. The at least one leakage prevention member 522 sealingly abuts against an inner wall of the expansion neck 51 to prevent liquid outside the flexible outer tube 10 from permeating into the flexible outer tube 10.

The female union connector 53 take the form of a cap with an open end facing down, and has a through hole 531 and an inner thread 532. The through hole 531 is formed through a top of the female union connector 53 to communicate with the open end for the female union connector 53 to be selectively mounted around a bordering portion between the expansion neck 51 of the flexible outer tube 10 and the portion of the flexible outer tube 10 that is higher than the expansion neck 51. The inner thread 532 is formed on an inner wall of the through hole 531.

The male union connector 54 has a cylindrical solid formed on a bottom end of the male union connector 54 and an annular wall formed on a top end of the male union connector 54. The cylindrical solid has a through hole 541 formed through the cylindrical solid and aligned in a direction perpendicular to a direction in which the flexible outer tube extends. The annular wall has an outer thread 542 formed on a periphery of the annular wall to correspond to the inner thread 532 of the female union connector 53.

The inner thread 532 of the female union connector 53 and the outer thread 542 of the male union connector 54 are square threads for the female union connector 53 and the male union connector 54 to be firmly engaged with each other.

A weight can be suspended under the male union connector 54 by tying a cable through the through hole 541 of the male union connector 54 to the weight so that the flexible outer tube 10 can be stretched along a direction of the gravitational force of the weight.

In sum, the expansion neck 51 over the bottom end 12 of the flexible outer tube 10 can be sealed by means of the plug 52 and the at least one leakage prevention member 522. The female union connector 53 is mounted around a bordering portion between the expansion neck 51 of the flexible outer tube 10 and the portion of the flexible outer tube 10 that is higher than the expansion neck 51. The male union connector 54 is then firmly engaged with the female union connector 53 through the square-thread engagement. The weight is suspended by tying the weight through the through hole 541 of the male union connector 54 such that the flexible outer tube 10 can be stretched along the direction of the gravitational direction of the weight. As being wholly and uniformly subjected to the gravitational force of the weight, the male union connector 54 is less damage-prone for the sake of the gravitational force. Accordingly, the tensile strength of the level meter is effectively increased, and life duration of the level meter therefore prolongs.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A sealing device of a level meter, the sealing device comprising:

a plug being cylindrical, and adapted to be inserted into an expansion neck formed on a bottom end of a flexible outer tube of the level meter in a close-fitting manner and being greater in inner diameter than a portion of the flexible outer tube that is higher than the expansion neck;

a female union connector taking the form of a cap with an open end facing down, and the female union connector having:

a through hole formed through a top of the female union connector to communicate with the open end for the female union connector to be selectively mounted around a bordering portion between the expansion neck of the flexible outer tube and the portion of the flexible outer tube that is higher than the expansion neck; and an inner thread formed on an inner wall of the through hole of the female union connector; and a male union connector having:

a cylindrical solid formed on a bottom end of the male union connector and having a through hole centrally formed through the cylindrical solid; and an annular wall formed on a top end of the male union connector and having an outer thread formed on a periphery of the annular wall to correspond to the inner thread of the female union connector.

2. The sealing device as claimed in claim 1, wherein the plug has:

at least one annular groove formed in a periphery of the plug; and at least one leakage prevention member, each one of the at least one leakage prevention member mounted in a corresponding annular groove, and being a resilient seal ring.

3. The sealing device as claimed in claim 2, wherein the inner thread of the female union connector and the outer thread of the male union connector are square threads.

4. The sealing device as claimed in claim 3, wherein the through hole of the cylindrical solid of the male union connector is aligned in a direction perpendicular to a direction in which the flexible outer tube extends, and the through hole of the cylindrical solid serves for tying a weight.

5. The sealing device as claimed in claim 2, wherein the through hole of the cylindrical solid of the male union connector is aligned in a direction perpendicular to a direction in which the flexible outer tube extends, and the through hole of the cylindrical solid serves for tying a weight.

6. The sealing device as claimed in claim 1, wherein the inner thread of the female union connector and the outer thread of the male union connector are square threads.

7. The sealing device as claimed in claim 6, wherein the through hole of the cylindrical solid of the male union connector is aligned in a direction perpendicular to a direction in which the flexible outer tube extends, and the through hole of the cylindrical solid serves for tying a weight.

8. The sealing device as claimed in claim 1, wherein the through hole of the cylindrical solid of the male union connector is aligned in a direction perpendicular to a direction in which the flexible outer tube extends, and the through hole of the cylindrical solid serves for tying a weight.

9. A level meter comprising:
a flexible outer tube having:
a top end;
a bottom end; and
an expansion neck formed on the bottom end of the flexible outer tube and being greater in inner diameter than a portion of the flexible outer tube that is higher than the expansion neck;
an electronic sensor mounted inside the flexible outer tube;
an outer tube fastening member mounted on the top end of the flexible outer tube;
an electrical connection module mounted in the top end of the flexible outer tube, and adapted to electrically connect the electronic sensor inside the flexible outer tube to an external sensing system and transmit electrical signals sensed by the electronic sensor to the external sensing system;
a sealing device having:
a plug being cylindrical, and inserted into the expansion neck of the flexible outer tube in a close-fitting manner;
a female union connector taking the form of a cap with an open end facing down, and the female union connector having:
a through hole formed through a top of the female union connector to communicate with the open end for the female union connector to be selectively mounted around a bordering portion between the expansion neck of the flexible outer tube and the portion of the flexible outer tube that is higher than the expansion neck; and
an inner thread formed on an inner wall of the through hole of the female union connector; and
a male union connector having:
a cylindrical solid formed on a bottom end of the male union connector and having a through hole centrally formed through the cylindrical solid; and
an annular wall formed on a top end of the male union connector and having an outer thread formed on a periphery of the annular wall to correspond to the inner thread of the female union connector.

10. The level meter as claimed in claim 9, wherein the plug of the sealing device has:
at least one annular groove formed in a periphery of the plug; and
at least one leakage prevention member, each one of the at least one leakage prevention member mounted in a corresponding annular groove, and being a resilient seal ring.

11. The level meter as claimed in claim 10, wherein the inner thread of the female union connector and the outer thread of the male union connector of the sealing device are square threads.

12. The level meter as claimed in claim 11, wherein the through hole of the cylindrical solid of the male union connector of the sealing device is aligned in a direction perpendicular to a direction in which the flexible outer tube extends, and the through hole of the cylindrical solid serves for tying a weight.

13. The level meter as claimed in claim 10, wherein the through hole of the cylindrical solid of the male union connector of the sealing device is aligned in a direction perpendicular to a direction in which the flexible outer tube extends, and the through hole of the cylindrical solid serves for tying a weight.

14. The level meter as claimed in claim 9, wherein the inner thread of the female union connector and the outer thread of the male union connector of the sealing device are square threads.

15. The level meter as claimed in claim 14, wherein the through hole of the cylindrical solid of the male union connector of the sealing device is aligned in a direction perpendicular to a direction in which the flexible outer tube extends, and the through hole of the cylindrical solid serves for tying a weight.

16. The level meter as claimed in claim 9, wherein the through hole of the cylindrical solid of the male union connector of the sealing device is aligned in a direction perpendicular to a direction in which the flexible outer tube extends, and the through hole of the cylindrical solid serves for tying a weight.

* * * * *